(12) United States Patent
Shimizu et al.

(10) Patent No.: US 7,352,160 B2
(45) Date of Patent: Apr. 1, 2008

(54) STEP-DOWN SWITCHING REGULATOR

(75) Inventors: Shinya Shimizu, Hyogo (JP); Masahiro Matsuo, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/634,711

(22) Filed: Dec. 5, 2006

(65) Prior Publication Data
US 2007/0075697 A1    Apr. 5, 2007

Related U.S. Application Data

(63) Continuation of application No. 11/378,741, filed on Mar. 16, 2006, now Pat. No. 7,166,993.

(30) Foreign Application Priority Data

Mar. 17, 2005   (JP) ............................. 2005-077514

(51) Int. Cl.
*G05F 1/46* (2006.01)
(52) U.S. Cl. ................................... 323/282
(58) Field of Classification Search ................ 323/282, 323/283, 284, 285, 351
See application file for complete search history.

(56) References Cited

U.S. PATENT DOCUMENTS 5,847,554 A    12/1998   Wilcox et al.
6,456,050 B1    9/2002   Agiman
6,580,258 B2    6/2003   Wilcox et al.
6,870,354 B2    3/2005   Nishimaki
7,166,993 B2 *  1/2007   Shimizu et al. ............. 323/282
2006/0164057 A1  7/2006  Kudo et al.

FOREIGN PATENT DOCUMENTS

JP        3561876        6/2004

* cited by examiner

*Primary Examiner*—Adolf Berhane
(74) *Attorney, Agent, or Firm*—Cooper & Dunham, LLP (57) ABSTRACT

A step-down switching regulator is disclosed that includes a first switching element, a smoothing circuit part including an inductor and a second switching element for synchronous rectification, a switching controller circuit part, and a reverse current detector circuit part that detects a reverse current flowing from the inductor to the second switching element and interrupts the reverse current by causing the switching controller circuit part to turn off the second switching element upon detection of the reverse current. Detecting a change in a set voltage, the reverse current detector circuit part stops, for a predetermined period of time, the operation of causing the switching controller circuit part to turn off the second switching element due to detection of the reverse current, and after the predetermined period of time is over, causes the switching controller circuit part to turn off the second switching element upon detection of the reverse current.

5 Claims, 5 Drawing Sheets

STEP-DOWN SWITCHING REGULATOR

CROSS-REFERENCE TO RELATED APPLICATION

This application is a Rule 1.53(b) Continuation of U.S. Ser. No. 11/378,741, filed Mar. 16, 2006 now U.S. Pat. No. 7,166,993, the entire contents of which are incorporated by reference herein.

BACKGROUND OF THE INVENTION

1. Field of the Invention

The present invention relates generally to step-down switching regulators of a synchronous rectification type capable of changing output voltage, and more particularly to a step-down switching regulator having a circuit to interrupt a backflow of current from an inductor for smoothing to a switching device for synchronous rectification by turning off the switching device upon detection of the backflow of current.

2. Description of the Related Art

Figure 1:
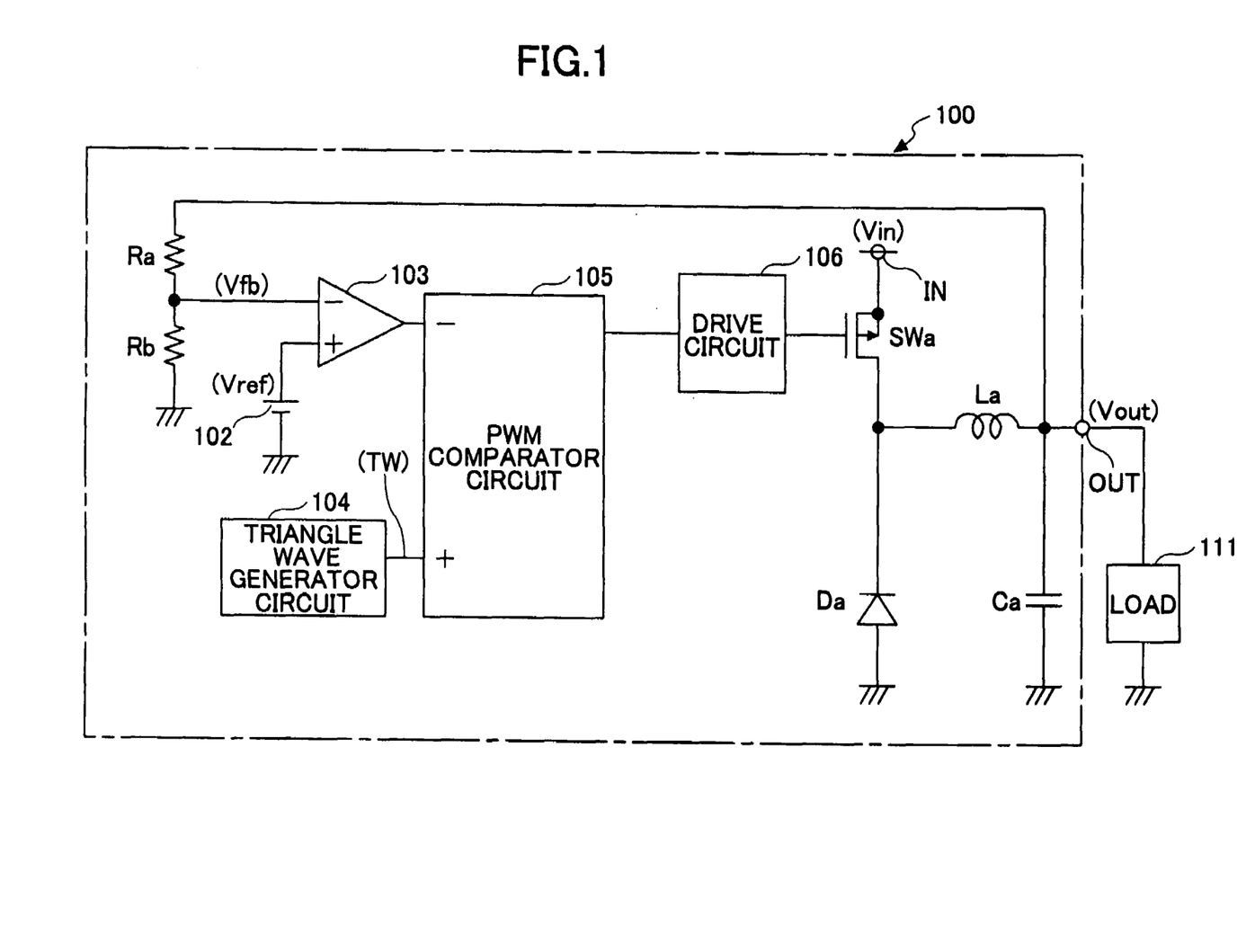
FIG. 1 is a circuit diagram showing a conventional step-down switching regulator.

FIG. 1 is a circuit diagram showing a conventional step-down switching regulator 100.

According to the switching regulator 100, a supply voltage supplied from a DC power supply such as a battery is input to an input terminal IN as an input voltage Vin, and a predetermined constant voltage is generated from the input voltage Vin and output from an output terminal OUT to a load 111 as an output voltage Vout.

The switching regulator 100 includes a switching device SWa to perform output control of the input voltage Vin, a diode Da forming a flywheel diode, an inductor La and a capacitor Ca for smoothing, and resistors Ra and Rb for output voltage detection. The resistors Ra and Rb generate a divided voltage Vfb by dividing the voltage Vout output to the load 111, and output the divided voltage Vfb.

The switching regulator 100 further includes a reference voltage generator circuit 102, an error amplifier circuit 103, and a triangle wave generator circuit 104. The reference voltage generator circuit 102 generates and outputs a predetermined reference voltage Vref. The error amplifier circuit 103 compares the divided voltage Vfb and the reference voltage Vref, and amplifies and outputs the voltage difference therebetween. The triangle wave generator circuit 104 generates and outputs a predetermined triangle wave signal TW. The switching regulator 100 further includes a PWM (Pulse Width Modulation) comparator circuit 105 and a drive circuit 106. The PWM comparator circuit 105 generates and outputs a pulse signal for PWM control corresponding to the voltage difference between the output voltage of the error amplifier circuit 103 and the triangle wave signal TW from the triangle wave generator circuit 104. The drive circuit 106 controls switching of the switching device SWa in accordance with the pulse signal from the PWM comparator circuit 105.

When the switching device SWa performs switching to turn ON, a current is supplied to the inductor La. When the switching device SWa turns OFF, energy stored in the inductor La is released through the diode Da. A current generated at this point is smoothed by the capacitor Ca and output from the output terminal OUT to the load 111. Further, the output voltage Vout output from the output terminal OUT is divided between the resistors Ra and Rb, and the divided voltage Vfb is input to the inverting input of the error amplifier circuit 103.

When the output voltage Vout of the switching regulator 100 increases, the output voltage of the error amplifier circuit 103 decreases, so that the duty cycle of the pulse signal from the PWM comparator circuit 105 is reduced. As a result, the ON-time of the switching device SWa is reduced, so that the output voltage Vout of the switching regulator 100 is controlled so as to decrease. On the other hand, when the output voltage Vout of the switching regulator 100 decreases, an operation opposite to the operation described above is performed. As a result, the output voltage Vout of the switching regulator 100 is controlled so as to be constant.

Thus, it is possible to change the output voltage of a switching regulator by changing a reference voltage (for example, see Japanese Laid-Open Patent Application No. 2001-161063).

On the other hand, according to a step-down switching regulator of a synchronous rectification type in which a switching device SWb for synchronous rectification is provided in place of the diode Da shown in FIG. 1 so that the switching devices SWa and SWb are controlled to switch ON and OFF complementarily, at a light load time when the resistance of the load 111 increases, the direction of a current flowing through the inductor La is reversed so that a current flowing from the inductor La to ground through the switching device SWb is generated, thereby causing a decrease in efficiency. In order to avoid this decrease in efficiency at a light load time, it is effective to include a control circuit that detects such a backflow of current and turns OFF the switching device SWb upon detection of the backflow of current.

However, in the synchronous rectification step-down switching regulator capable of changing output voltage, it is necessary to change the output voltage swiftly even at a light load time, so that it is difficult to interrupt a backflow of current by turning OFF the switching device SWb upon detection of the backflow of current. This causes the problem of reduced efficiency at a light load time.

SUMMARY OF THE INVENTION

According to one embodiment of the present invention, there is provided a step-down switching regulator of a synchronous rectification type capable of changing output voltage in which the above-described disadvantage is eliminated.

According to one embodiment of the present invention, there is provided a step-down switching regulator of a synchronous rectification type capable of changing output voltage which regulator includes a circuit to interrupt a backflow of current from an inductor upon detection of the backflow of current and disable the function of interrupting the backflow of current when detecting the backflow of current in an output voltage change period in order to improve efficiency at a light load time, thereby being capable of changing the output voltage swiftly and reducing a decrease in efficiency at a light load time.

According to one embodiment of the present invention, there is provided a step-down switching regulator of a synchronous rectification type converting a voltage input to an input terminal into a set voltage and outputting the converted voltage from an output terminal, the step-down switching regulator including: a first switching element configured to switch in accordance with a first control signal input to a control electrode thereof so as to perform output control of the input voltage; a smoothing circuit part configured to smooth an output voltage of the first switching element and output the smoothed voltage to the output terminal, the smoothing circuit including an inductor connected between an output end of the first switching element and the output terminal, and a second switching element for synchronous rectification configured to release energy stored in the inductor in accordance with a second control signal input to a control electrode thereof; a switching controller circuit part configured to control switching of the first switching element so that the set voltage is output from the output terminal, and to cause the second switching element to perform switching opposite to the switching of the first switching element; and a reverse current detector circuit part configured to detect a reverse current flowing from the inductor to the second switching element, and to interrupt the reverse current by causing the switching controller circuit part to turn off the second switching element upon detection of the reverse current, wherein upon detection of a change in the set voltage, the reverse current detector circuit part stops, for a predetermined period of time, the operation of causing the switching controller circuit part to turn off the second switching element due to detection of the reverse current, and after the predetermined period of time is over, the reverse current detector circuit part causes the switching controller circuit part to turn off the second switching element upon detection of the reverse current.

According to a step-down switching regulator according to one embodiment of the present invention, when a change in a set voltage is detected, the operation of causing a switching controller circuit part to turn off a second switching element due to detection of a reverse current is stopped for a predetermined period of time, and after the predetermined period is over, the switching controller circuit part is caused to turn off the second switching element upon detection of the reverse current. This configuration makes it possible to change output voltage swiftly, and to improve efficiency at a light load time in particular.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

First Embodiment

Figure 2:
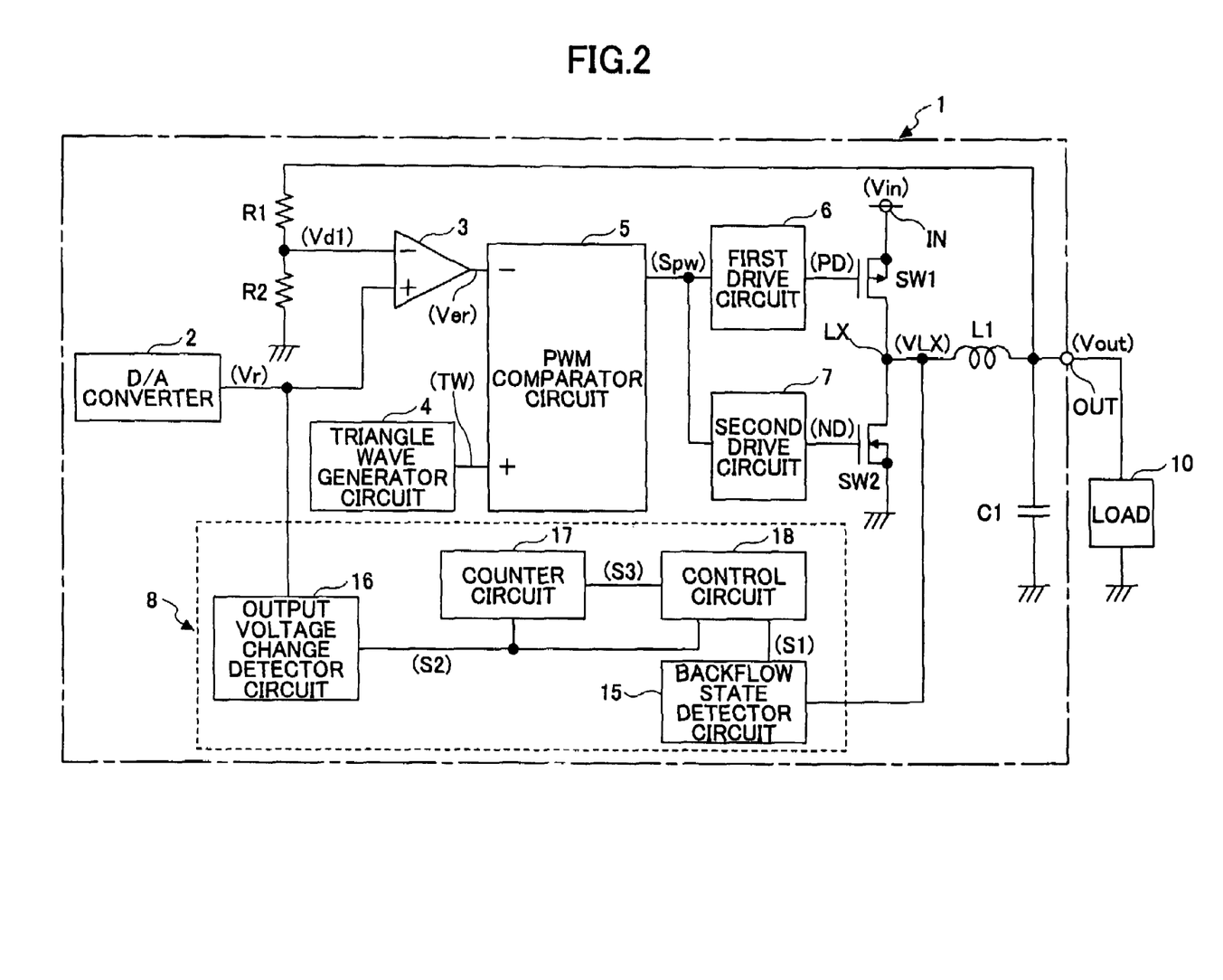
FIG. 2 is a circuit diagram showing a step-down switching regulator according to a first embodiment of the present invention.

FIG. 2 is a circuit diagram showing a step-down switching regulator 1 according to a first embodiment of the present invention.

Referring to FIG. 2, according to the switching regulator 1, a supply voltage supplied from a DC power supply (not graphically illustrated) such as a battery is input to an input terminal IN as an input voltage Vin, and a predetermined constant voltage is generated from the input voltage Vin and output from an output terminal OUT to a load 10 as an output voltage Vout.

The switching regulator 1 includes a switching device SW1 formed of a PMOS transistor, a switching device SW2 for synchronous rectification formed of an NMOS transistor, an inductor L1 and a capacitor C1 for smoothing, and resistors R1 and R2 for output voltage detection. The switching device SW1 performs output control of the input voltage Vin input to the input terminal IN. The resistors R1 and R2 generate a divided voltage Vd1 by dividing the voltage Vout output from the output terminal OUT, and output the divided voltage Vd1. The switching regulator 1 further includes a D/A (digital-to-analog) converter 2, an error amplifier circuit 3, and a triangle wave generator circuit 4. The D/A converter 2 generates and outputs a reference voltage Vr according to set digital data. The error amplifier circuit 3 compares the divided voltage Vd1 and the reference voltage Vr, generates a voltage Ver by amplifying the voltage difference therebetween, and outputs the generated voltage Ver. The triangle wave generator circuit 4 generates and outputs a predetermined triangle wave signal TW.

The switching regulator 1 further includes a PWM comparator circuit 5, a first drive circuit 6, and a second drive circuit 7. The PWM comparator circuit 5 compares the output voltage Ver of the error amplifier circuit 3 and the triangle wave signal TW from the triangle wave generator circuit 4, and generates and outputs a pulse signal Spw for performing PWM control, the pulse signal Spw having a pulse width according to the output voltage Ver. The first drive circuit 6 generates, in accordance with the pulse signal Spw from the PWM comparator circuit 5, a control signal PD for controlling switching of the switching device SW1, and drives the switching device SW1. The second drive circuit 7 generates, in accordance with the pulse signal Spw from the PWM comparator circuit 5, a control signal ND for controlling switching of the switching device SW2 for synchronous rectification, and drives the switching device SW2 for synchronous rectification.

The switching regulator 1 further includes a reverse current detector circuit part 8. The reverse current detector circuit part 8 detects generation of a reverse current flowing from the inductor L1 to ground through the switching device SW2 for synchronous rectification as a result of reversal of the direction of a current flowing through the inductor L1. When there is no change in the reference voltage Vr, the reverse current detector circuit part 8, upon detection of generation of the reverse current, outputs a control signal to the second drive circuit 7 so as to turn OFF the switching device SW2 for synchronous rectification. However, when there is a change in the reference voltage Vr, the reverse current detector circuit part 8 prevents, for a predetermined period of time, the switching device SW2 for synchronous rectification from being turned OFF even if the reverse current detector circuit part 8 detects generation of the reverse current.

In the switching regulator 1, the parts other than the inductor L1 and the capacitor C1 may be formed on a single semiconductor chip such as single-crystal silicon so as to form a single IC. Alternatively, the parts other than the D/A converter 2, the switching device SW1, the switching device SW2 for synchronous rectification, the inductor L1, and the capacitor C1 may be formed on a single semiconductor chip such as single-crystal silicon so as to form a single IC. The switching device SW1 may form a first switching element. The switching device SW2 may form a second switching element. The switching device SW2, the inductor L1, and the capacitor C1 may form a smoothing circuit part. The resistors R1 and R2, the D/A converter 2, the error amplifier circuit 3, the triangle wave generator circuit 4, the PWM comparator circuit 5, the first drive circuit 6, and the second drive circuit 7 may form a switching controller circuit part. The resistors R1 and R2 may form an output voltage detector circuit. The D/A converter 2 may form a reference voltage generator circuit part. The error amplifier circuit 3, the triangle wave generator circuit 4, the PWM comparator circuit 5, the first drive circuit 6, and the second drive circuit 7 may form a control circuit part.

The switching device SW1 and the switching device SW2 for synchronous rectification are connected in series between the input terminal IN and ground. The inductor L1 is connected between the output terminal OUT and the connection LX of the switching device SW1 and the switching device SW2 for synchronous rectification. The capacitor C1 is connected between the output terminal OUT and ground. A series circuit of the resistors R1 and R2 is also connected between the output terminal OUT and ground. The connection of the resistors R1 and R2 is connected to the inverting input of the error amplifier circuit 3. The reference voltage Vr is input to the non-inverting input of the error amplifier circuit 3.

The output voltage Ver of the error amplifier circuit 3 is input to the inverting input of a comparator forming the PWM comparator circuit 5. The triangle wave signal TW from the triangle wave generator circuit 4 is input to the non-inverting input of the comparator. The pulse signal Spw from the PWM comparator circuit 5 is output to each of the first drive circuit 6 and the second drive circuit 7. The first drive circuit 6 outputs the control signal PD for controlling switching of the switching device SW1 to the gate of the switching device SW1. The second drive circuit 7 outputs the control signal ND for controlling switching of the switching device SW2 for synchronous rectification to the gate of the switching device SW2 for synchronous rectification.

The voltage VLX at the connection LX and the reference voltage Vr are input to the reverse current detector circuit part 8. When the reverse current detector circuit part 8 detects a backflow of current from the voltage VLX, for example, when the reverse current detector circuit part 8 detects generation of a backflow of current by determining that the voltage VLX is positive, the reverse current detector circuit part 8 causes the second drive circuit 7 to turn OFF the switching device SW2 for synchronous rectification. Further, the reverse current detector circuit part 8 detects the reference voltage Vr. When there is a change in the reference voltage Vr, the reverse current detector circuit part 8 prevents, for a predetermined period of time, the second drive circuit 7 from turning OFF the switching device SW2 even if the reverse current detector circuit part 8 detects a backflow of current from the voltage VLX.

The reverse current detector circuit part 8 includes a backflow state detector circuit 15 and an output voltage change detector circuit 16. The backflow state detector circuit 15 detects the voltage VLX at the connection LX. When the backflow state detector circuit 15 detects a backflow of current by determining that the detected voltage VLX is positive, the backflow state detector circuit 15 generates and outputs a predetermined reverse current detection signal S1 indicating detection of the backflow. The output voltage change detector circuit 16 detects the reference voltage Vr. When the output voltage change detector circuit 16 detects a change in the reference voltage Vr, the output voltage change detector circuit 16 generates and outputs a predetermined output voltage change signal S2. The reverse current detector circuit part 8 further includes a counter circuit 17 and a control circuit 18. The counter circuit 17 starts counting when the output voltage change detector circuit 16 outputs the predetermined output voltage change signal S2, and outputs a predetermined signal S3 when the count value reaches a predetermined value. The control circuit 18 generates a signal to turn OFF the switching device SW2 for synchronous rectification in accordance with the reverse current detection signal S1, the output voltage change signal S2, and the signal S3, and outputs the generated signal to the second drive circuit 7. The control circuit 18 may form a control signal generator circuit. The signal S3 may form a predetermined signal.

According to this configuration, when the switching device SW1 performs switching to turn ON, a current is supplied to the inductor L1. At this point, the switching device SW2 for synchronous rectification is OFF. When the switching device SW1 turns OFF, the switching device SW2 for synchronous rectification turns ON, so that energy stored in the inductor L1 is released through the switching device SW2 for synchronous rectification. A current generated at this point is smoothed by the capacitor C1 and output from the output terminal OUT to the load 10. Further, the output voltage Vout output from the output terminal OUT is divided between the resistors R1 and R2 for output voltage detection, and the divided voltage Vd1 is input to the inverting input of the error amplifier circuit 3.

When the output voltage Vout of the switching regulator 1 increases, the output voltage Ver of the error amplifier circuit 3 decreases, so that the duty cycle of the pulse signal Spw from the PWM comparator circuit 5 is reduced. As a result, the ON-time of the switching device SW1 is reduced, so that the output voltage Vout of the switching regulator 1 is controlled so as to decrease. On the other hand, when the output voltage Vout of the switching regulator 1 decreases, an operation opposite to the operation described above is performed. As a result, the output voltage Vout of the switching regulator 1 is controlled so as to be constant.

Here, when the digital data set in the D/A converter 2 are changed so that the output reference voltage Vr is changed, the output voltage change detector circuit 16 detects the change of the setting of the output voltage Vout, and outputs the predetermined output voltage change signal S2. When the predetermined output voltage change signal S2 is input to the control circuit 18, the control circuit 18 nullifies the reverse current detection signal S1 from the backflow state detector circuit 15, and the counter circuit 17 performs counting to measure a predetermined period of time for which the reverse current detection signal S1 from the backflow state detector circuit 15 is nullified. When the counter circuit 17 completes the counting, the counter circuit 17 outputs the predetermined signal S3 to the control circuit 18. When the predetermined signal S3 is input to the control circuit 18, the control circuit 18 outputs the control signal to turn OFF the switching device SW2 for synchronous rectification to the second drive circuit 7 in accordance with the reverse current detection signal S1 from the backflow state detector circuit 15.

Figure 3:
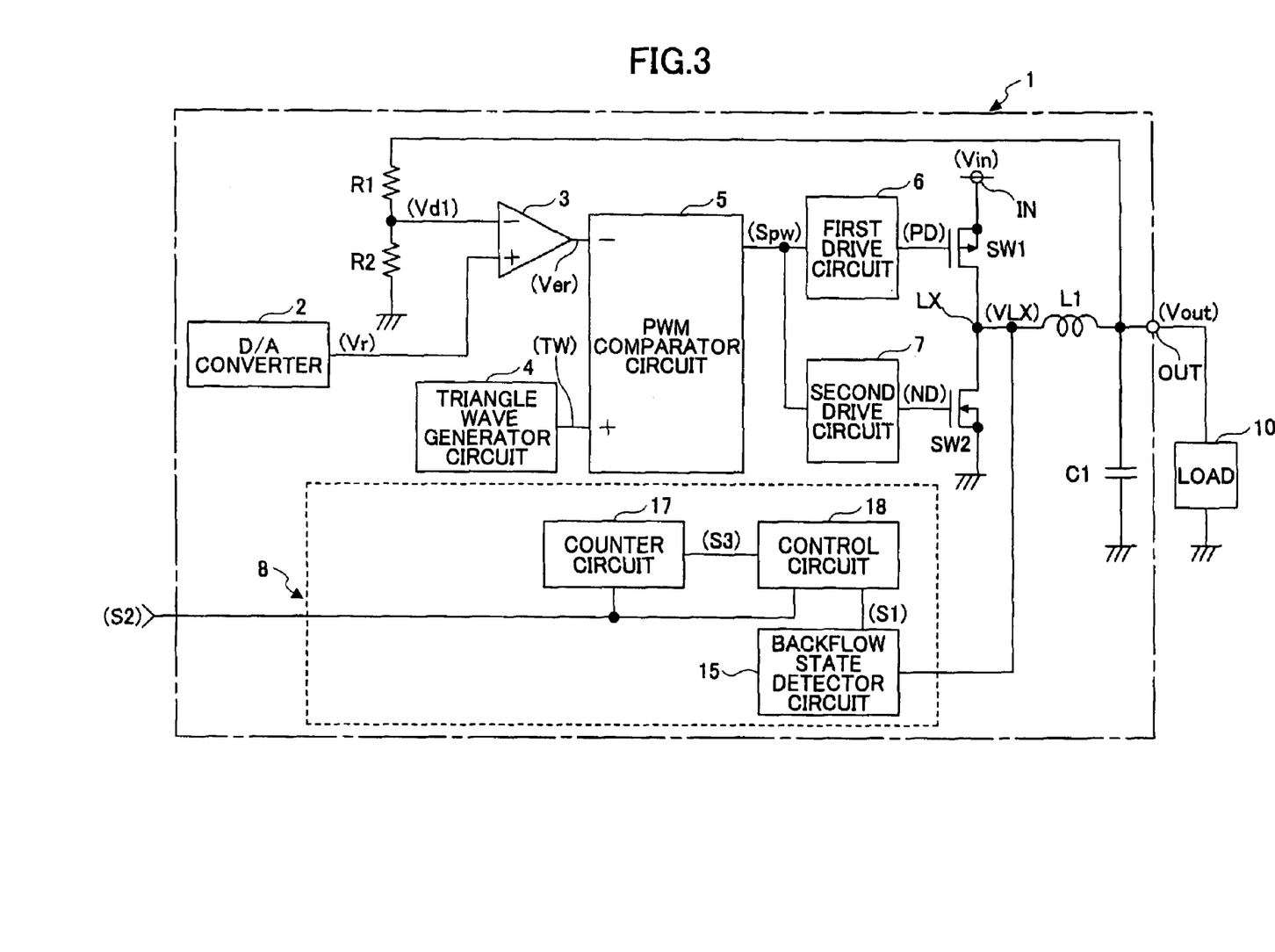
FIG. 3 is a circuit diagram showing another configuration of the step-down switching regulator according to the first embodiment of the present invention.

In the above description, the output voltage change detector circuit 16 outputs the predetermined output voltage change signal S2 when there is a change in the reference voltage Vr. Alternatively, the output voltage change detector circuit 16 may output the predetermined output voltage change signal S2 only when the output voltage change detector circuit 16 detects a decrease in the reference voltage Vr. Further, the predetermined output voltage change signal S2 may be input to each of the counter circuit 17 and the control circuit 18 externally. In this case, the switching regulator 1 may have a configuration as shown in FIG. 3, where the backflow state detector circuit 15, the counter circuit 17, and the control circuit 18 form the reverse current detector circuit 8.

Thus, according to the switching regulator 1 according to the first embodiment, when there is no change in the reference voltage Vr, the reverse current detector circuit part 8 causes the second drive circuit 7 to turn OFF the switching device SW2 for synchronous rectification when the reverse current detector circuit part 8 detects from the voltage VLX at the connection LX a reverse current flowing from the inductor L1 to ground through the switching device SW2 for synchronous rectification. When the reverse current detector circuit part 8 detects a change in the reference voltage Vr, the reverse current detector circuit part 8 prevents the second drive circuit 7 from turning OFF the switch device SW2 for synchronous rectification for a predetermined period of time even if the reverse current detector circuit part 8 detects the reverse current. This configuration makes it possible to change the output voltage Vout swiftly and improve efficiency at a light load time.

Second Embodiment

According to the above-described first embodiment, the output voltage Vout is changed by changing the value of the reference voltage Vr. Meanwhile, according to a second embodiment of the present invention, the reference voltage Vr is constant while the divided voltage Vd1 is changed by an external analog-level signal. In this case, the reverse current detector circuit part 8 of FIG. 2 may detect a change in the setting of the output voltage Vout by detecting the analog-level signal. This configuration is employed in the second embodiment.

Figure 4:
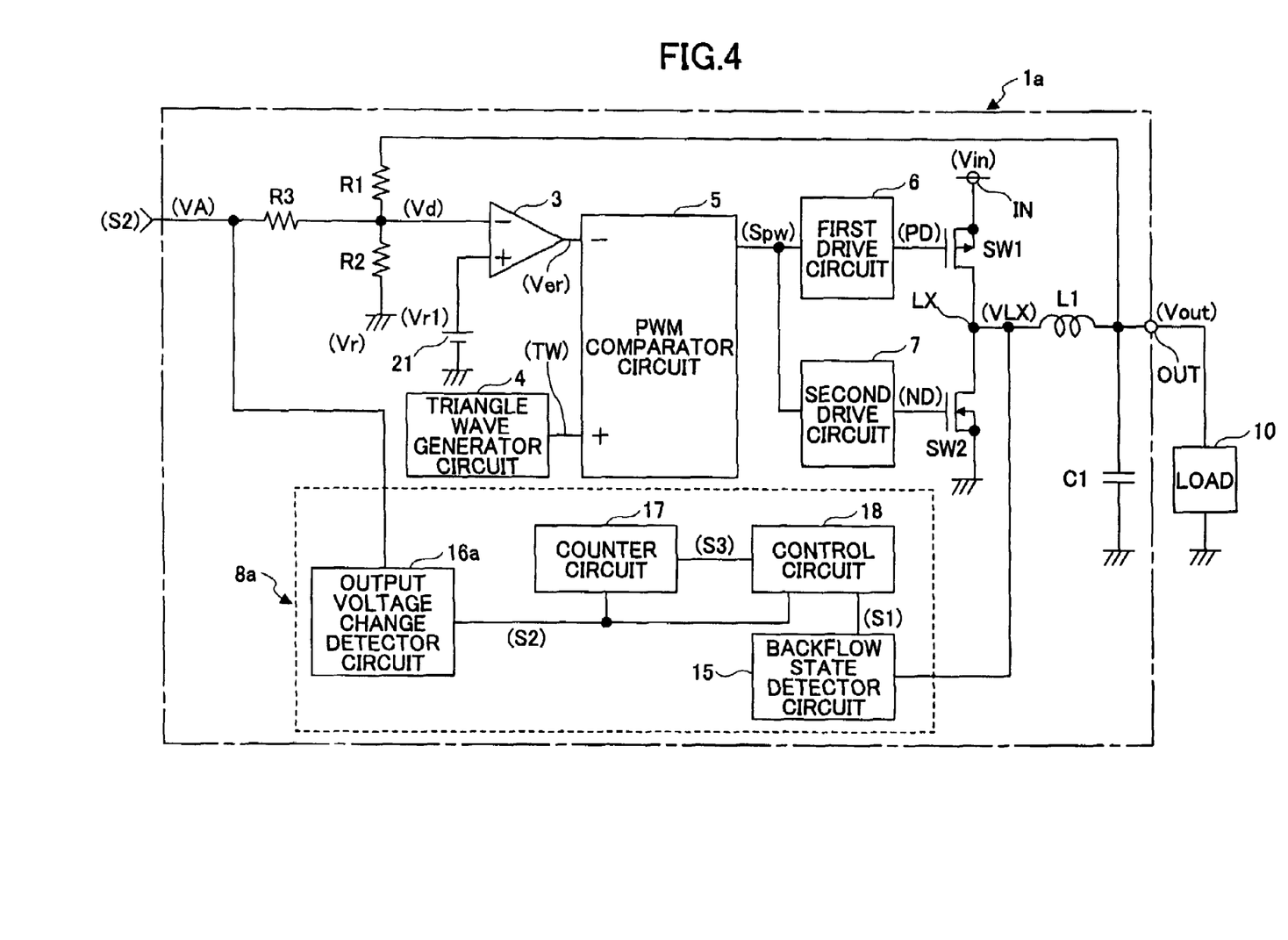
FIG. 4 is a circuit diagram showing a step-down switching regulator according to a second embodiment of the present invention.

FIG. 4 is a circuit diagram showing a step-down switching regulator 1a according to the second embodiment. In FIG. 4, the same elements as those of FIG. 2 are referred to by the same numerals, and a description thereof is omitted. With respect to FIG. 4, a description is given of the differences from FIG. 2.

In FIG. 4, the differences from FIG. 2 are as follows. The D/A converter 2 of FIG. 2 is replaced by a reference voltage generator circuit 21 that generates and outputs a predetermined reference voltage Vr1. An external analog signal SA is input to the inverting input of the error amplifier circuit 3 through a resistor R3. The reverse current detector circuit part 8 of FIG. 2 is replaced by a reverse current detector circuit part 8a in which an output voltage change detector circuit 16a that detects a change in the voltage setting of the output voltage Vout by detecting a change in the voltage VA of the analog signal SA is provided in place of the output voltage change detector circuit 16 of FIG. 2.

Referring to FIG. 4, the switching regulator 1a includes the switching device SW1, the switching device SW2 for synchronous rectification, the inductor L1, the capacitor C1, the resistors R1 through R3, the reference voltage generator circuit 21 that generates and outputs the predetermined reference voltage Vr1, the error amplifier circuit 3, the triangle wave generator circuit 4, the PWM comparator circuit 5, the first drive circuit 6, the second drive circuit 7, and the reverse current detector circuit part 8a. The resistors R1 through R3 may form an output voltage detector circuit part. The reference voltage generator circuit 21 may form a reference voltage generator circuit part. The resistors R1 through R3, the reference voltage generator circuit 21, the error amplifier circuit 3, the triangle wave generator circuit 4, the PWM comparator circuit 5, the first drive circuit 6, and the second drive circuit 7 may form a switching controller circuit part.

The reverse current detector circuit part 8a includes the backflow state detector circuit 15, the output voltage change detector circuit 16a, the counter circuit 17, and the control circuit 18. The output voltage change detector circuit 16a detects the voltage VA of the analog signal SA. When the output voltage change detector circuit 16a detects a change in the voltage VA of the analog signal SA, the output voltage change detector circuit 16a generates and outputs the predetermined output voltage change signal S2. The counter circuit 17 starts counting when the output voltage change detector circuit 16a outputs the predetermined output voltage change signal S2. When the count value reaches a predetermined value, the counter circuit 17 outputs the predetermined signal S3.

In the switching regulator 1a, the parts other than the inductor L1 and the capacitor C1 may be formed on a single semiconductor chip such as single-crystal silicon so as to form a single IC. Alternatively, the parts other than the switching device SW1, the switching device SW2 for synchronous rectification, the inductor L1, and the capacitor C1 may be formed on a single semiconductor chip such as single-crystal silicon so as to form a single IC.

The divided voltage Vd1 and the voltage VA of the external analog signal SA through the resistor R3 are input to the inverting input of the error amplifier circuit 3. The set voltage of the output voltage Vout is changed by changing the voltage VA of the analog signal SA. Therefore, when there is no change in the voltage VA, the reverse current detector circuit part 8a, upon detection of generation of a reverse current, outputs a control signal to the second drive circuit 7 so as to turn OFF the switching device SW2 for synchronous rectification. On the other hand, when there is a change in the voltage VA, the reverse current detector circuit part 8a prevents, for a predetermined period of time, the switching device SW2 for synchronous rectification from turning OFF even if the reverse current detector circuit part 8a detects generation of a reverse current. That is, the output voltage change detector circuit 16a detects the voltage VA of the analog signal SA, and when there is a change in the voltage VA, the output voltage change detector circuit 16a generates and outputs the predetermined output voltage change signal S2.

In the above description, the output voltage change detector circuit 16a outputs the predetermined output voltage change signal S2 when there is a change in the voltage VA. Alternatively, the output voltage change detector circuit 16a may output the predetermined output voltage change signal S2 only when the output voltage change detector circuit 16a detects a decrease in the voltage VA.

Thus, according to the switching regulator 1a according to the second embodiment, when there is no change in the voltage VA of the analog signal SA, the reverse current detector circuit part 8a causes the second drive circuit 7 to turn OFF the switching device SW2 for synchronous rectification when the reverse current detector circuit part 8a detects from the voltage VLX at the connection LX a reverse current flowing from the inductor L1 to ground through the switching device SW2 for synchronous rectification. When the reverse current detector circuit part 8a detects a change in the voltage VA of the analog signal SA, the reverse current detector circuit part 8a prevents the second drive circuit 7 from turning OFF the switch device SW2 for synchronous rectification for a predetermined period of time even if the reverse current detector circuit part 8a detects the reverse current. This configuration makes it possible to produce the same effects as in the first embodiment.

Third Embodiment

A description is given of a third embodiment of the present invention.

In each of the first and second embodiments, the switching device SW1 may turn ON to output the input voltage Vin while the output voltage Vout is set to be higher than or equal to the input voltage Vin, and/or the gate-source voltage of the switching device SW1 may be reduced to limit output current when more current than expected flows from the output terminal OUT because of occurrence of an abnormality such as short-circuiting of the output terminal OUT. This configuration is employed in the third embodiment.

Figure 5:
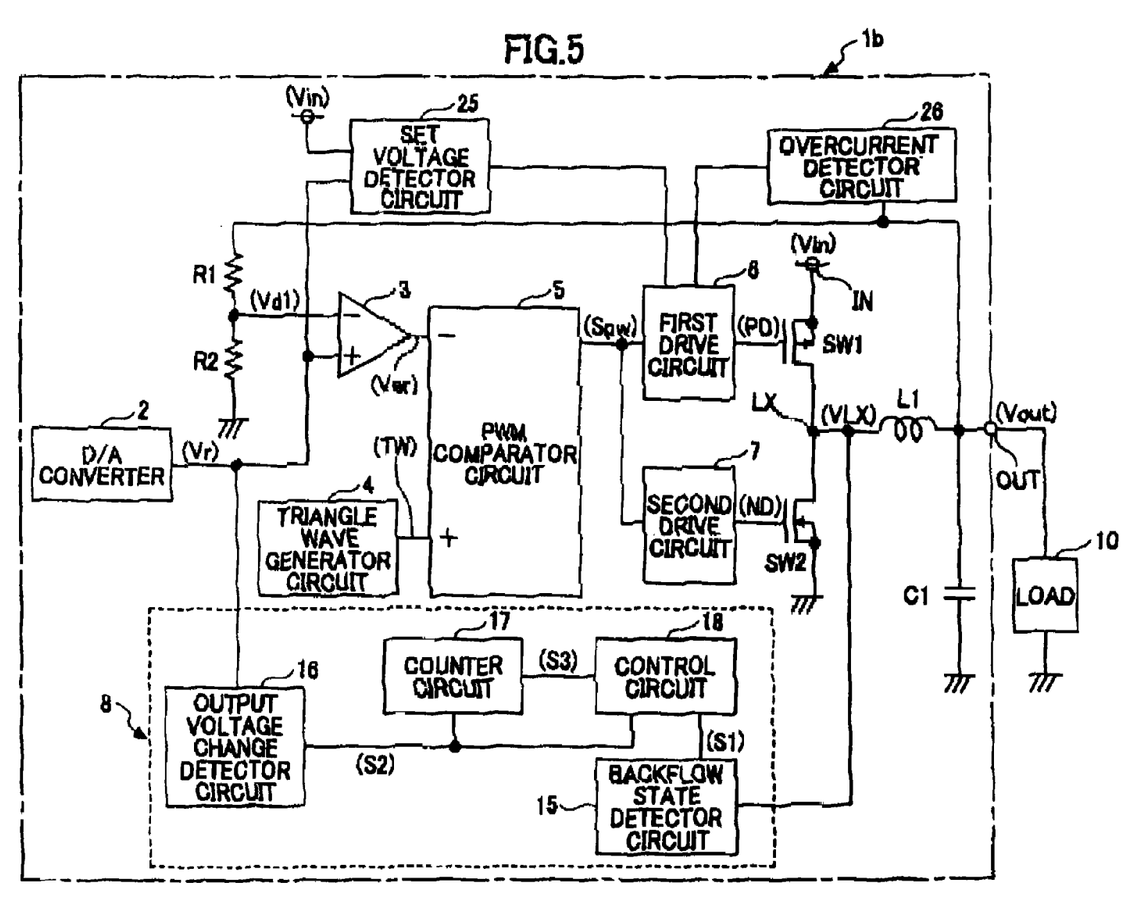
FIG. 5 is a circuit diagram showing a step-down switching regulator according to a third embodiment of the present invention.

FIG. 5 is a circuit diagram showing a step-down switching regulator 1b according to the third embodiment. FIG. 5 shows a configuration based on the configuration of FIG. 2 by way of example. In FIG. 5, the same elements as those of FIG. 2 are referred to by the same numerals, and a description there of is omitted. With respect to FIG. 5, a description is given of the differences from FIG. 2.

In FIG. 5, the differences from FIG. 2 are as follows. The switching regulator 1b further includes a set voltage detector circuit 25 and an overcurrent detector circuit 26. The set voltage detector circuit 25 determines whether the output voltage Vout is set to be higher than or equal to the input voltage Vin. The overcurrent detector circuit 26 detects a flow of current higher than or equal to a predetermined value (a flow of overcurrent) from the output terminal OUT.

Referring to FIG. 5, the switching regulator 1b includes the switching device SW1, the switching device SW2 for synchronous rectification, the inductor L1, the capacitor C1, the resistors R1 and R2, the D/A converter 2, the error amplifier circuit 3, the triangle wave generator circuit 4, the PWM comparator circuit 5, the first drive circuit 6, the second drive circuit 7, the reverse current detector circuit part 8, the set voltage detector circuit 25, and the overcurrent detector circuit 26. The set voltage detector circuit 25 detects the reference voltage Vr, and determines from the detected reference voltage Vr whether the output voltage Vout is set to be higher than or equal to the input voltage Vin. The overcurrent detector circuit 26 detects a current output from the output terminal OUT, and determines whether the detected current is an overcurrent, which is a current higher than or equal to a predetermined value.

In the switching regulator 1b, the parts other than the inductor L1 and the capacitor C1 may be formed on a single semiconductor chip such as single-crystal silicon so as to form a single IC. Alternatively, the parts other than the D/A converter 2, the switching device SW1, the switching device SW2 for synchronous rectification, the inductor L1, and the capacitor C1 may be formed on a single semiconductor chip such as single-crystal silicon so as to form a single IC. The set voltage detector circuit 25 may form a set voltage detector circuit part. The overcurrent detector circuit 26 may form an overcurrent detector circuit part.

The input voltage Vin and the reference voltage Vr are input to the set voltage detector circuit 25. The set voltage detector circuit 25 determines from the reference voltage Vr whether the output voltage Vout is set to be higher than or equal to the input voltage Vin. While the output voltage Vout is set to be higher than or equal to the input voltage Vin, the set voltage detector circuit 25 causes the first drive circuit 6 to keep the switching device SW1 ON. The overcurrent detector circuit 26 detects a current output from the output terminal OUT. When the overcurrent detector circuit 26 determines that the current output from the output terminal OUT is higher than or equal to a predetermined value, that is, when the overcurrent detector circuit 26 detects an overcurrent, the overcurrent detector circuit 26 causes the first drive circuit 6 to reduce the gate-source voltage of the switching device SW1 so as to limit the output current of the switching device SW1.

The configuration in the case of application to the configuration of FIG. 4 is the same as that of FIG. 5 except that the set voltage detector circuit 25 determines from the voltage VA of the analog signal SA whether the output voltage Vout is set to be higher than or equal to the input voltage Vin. Accordingly, a description thereof is omitted.

Thus, the switching regulator 1b of the third embodiment includes the set voltage detector circuit 25 that determines whether the output voltage Vout is set to be higher than or equal to the input voltage Vin and the overcurrent detector circuit 26 that detects a current output from the output terminal OUT and determines whether the detected current is an overcurrent higher than or equal to a predetermined value, in addition to the configuration of the switching regulator 1 of the first embodiment or the switching regulator 1a of the second embodiment. Accordingly, the following effects can be produced in addition to the effects according to the first and second embodiments. That is, it is possible to prevent the occurrence of a problem when the output voltage Vout is set to be higher than or equal to the input voltage and/or when more current than expected flows from the output terminal because of occurrence of an abnormality such as short-circuiting of the output terminal OUT, so that it is possible to increase reliability.

The above description of the third embodiment is given of the case where the switching regulator 1b includes both the set voltage detector circuit 25 and the overcurrent detector circuit 26. Alternatively, the switching regulator 1b may include only one of the set voltage detector circuit 25 and the overcurrent detector circuit 26. The operation in this case is the same as that described above in the third embodiment, and accordingly, a description thereof is omitted.

According to a step-down switching regulator according to one embodiment of the present invention, when a change in a set voltage is detected, the operation of causing a switching controller circuit part to turn off a second switching element due to detection of a reverse current is stopped for a predetermined period of time, and after the predetermined period is over, the switching controller circuit part is caused to turn off the second switching element upon detection of the reverse current. This configuration makes it possible to change output voltage swiftly, and to improve efficiency at a light load time in particular.

The present invention is not limited to the specifically disclosed embodiments, and variations and modifications may be made without departing from the scope of the present invention.

The present application is based on Japanese Priority Patent Application No. 2005-077514, filed on Mar. 17, 2005, the entire contents of which are hereby incorporated by reference.

What is claimed is:

1. A synchronous-rectification step-down switching regulator capable of changing an output voltage, comprising:
a first switching element configured to switch in accordance with a first control signal input to a control electrode thereof so as to perform output control of an input voltage;
an inductor connected between an output end of the first switching element and an output terminal;
a second switching element for synchronous rectification configured to release energy stored in the inductor in accordance with a second control signal input to a control electrode thereof;
a switching controller circuit part configured to control switching of the first switching element, and cause the second switching element to perform switching opposite to the switching of the first switching element;
a comparator circuit configured to compare a reference voltage to a divided voltage corresponding to said output voltage; and
a reverse current detector circuit part configured to detect a reverse current flowing from the inductor to the second switching element,
wherein when said comparator circuit detects no change in the reference voltage, the reverse current detector circuit part, upon detection of generation of the reverse current, outputs a control signal to the switching controller circuit part so as to turn off the second switching element for synchronous rectification, and when said comparator circuit detects a change in said reference voltage compared with said divided voltage, the reverse current detector circuit part stops, for a predetermined period of time, the switching controller circuit part from turning off the second switching element even if the reverse current detector circuit part detects the reverse current.

2. A synchronous-rectification step-down switching regulator capable of changing an output voltage, comprising:
a first switching element configured to switch in accordance with a first control signal input to a control electrode thereof so as to perform output control of an input voltage;
an inductor connected between an output end of the first switching element and an output terminal;
a second switching element for synchronous rectification configured to release energy stored in the inductor in accordance with a second control signal input to a control electrode thereof;
a switching controller circuit part configured to control switching of the first switching element, and cause the second switching element to perform switching opposite to the switching of the first switching element; and
a reverse current detector circuit part configured to detect a reverse current flowing from the inductor to the second switching element, and interrupt the reverse current by causing the switching controller circuit part to turn off the second switching element upon detection of the reverse current,
wherein upon detection of a change in a reference voltage compared with a divided voltage of the output voltage, the reverse current detector circuit part stops, for a predetermined period of time, the operation of causing the switching controller circuit part to turn off the second switching element due to detection of the reverse current, and after the predetermined period of time is over; the reverse current detector circuit part causes the switching controller circuit part to turn off the second switching element upon detection of the reverse current,
wherein the switching controller circuit part and the reverse current detector circuit part are formed on a single semiconductor chip so as to form a single IC.

3. The synchronous-rectification step-down switching regulator as claimed in claim 2, wherein the first switching element and the second switching element are formed on the single semiconductor chip so as to form the single IC.

4. A synchronous-rectification step-down switching regulator capable of changing an output voltage, comprising:
first switching means for switching in accordance with a first control signal input to a control electrode thereof so as to perform output control of an input voltage;
an inductor connected between an output end of the first switching means and an output terminal;
second switching means for synchronous rectification and configured to release energy stored in the inductor in accordance with a second control signal input to a control electrode thereof;
switching control means for controlling switching of the first switching means, and causing the second switching means to perform switching opposite to the switching of the first switching means; and
reverse current detecting means for detecting a reverse current flowing from the inductor to the second switching means, and interrupting the reverse current by causing the switching control means to turn off the second switching means upon detection of the reverse current,
wherein upon detection of a change in a reference voltage compared with a divided voltage of the output voltage, the reverse current detecting means stops, for a predetermined period of time, the operation of causing the switching control means to turn off the second switching means due to detection of the reverse current, and after the predetermined period of time is over, the reverse current detecting means causes the switching control means to turn off the second switching means upon detection of the reverse current,
wherein the switching control means and the reverse current detecting means are formed on a single semiconductor chip so as to form a single IC.

5. The synchronous-rectification step-down switching regulator as claimed in claim 4, wherein the first switching means and the second switching means are formed on the single semiconductor chip so as to form the single IC.

* * * * *